(12) United States Patent
Williams et al.

(10) Patent No.: US 10,800,528 B1
(45) Date of Patent: Oct. 13, 2020

(54) MISSION EQUIPMENT RESTRAINT SYSTEM

(71) Applicant: Safe, Inc., Tempe, AZ (US)

(72) Inventors: Nicholas A. Williams, Tempe, AZ (US); Stanley P. Desjardins, Scottsdale, AZ (US)

(73) Assignee: Safe, Inc., Tempe, AZ (US)

( * ) Notice: Subject to any disclaimer, the term of this patent is extended or adjusted under 35 U.S.C. 154(b) by 27 days.

(21) Appl. No.: 16/426,362

(22) Filed: May 30, 2019

Related U.S. Application Data

(60) Provisional application No. 62/682,060, filed on Jun. 7, 2018.

(51) Int. Cl.
| | | |
|---|---|---|
| *B64D 9/00* | (2006.01) | |
| *B60P 7/08* | (2006.01) | |
| *B60P 7/13* | (2006.01) | |
| *B60P 7/16* | (2006.01) | |
| *B60P 7/10* | (2006.01) | |
| *B60P 7/18* | (2006.01) | |

(52) U.S. Cl.
CPC ............... *B64D 9/003* (2013.01); *B60P 7/08* (2013.01); *B60P 7/0807* (2013.01); *B60P 7/0823* (2013.01); *B60P 7/0869* (2013.01); *B60P 7/10* (2013.01); *B60P 7/13* (2013.01); *B60P 7/16* (2013.01); *B60P 7/18* (2013.01)

(58) Field of Classification Search
CPC .... B64D 9/003; B60P 7/18; B60P 7/13; B60P 7/08; B60P 7/0823; B60P 7/16; B60P 7/0869; B60P 7/0807; B60P 7/10

USPC ........... 410/41, 97, 99, 100, 155; 244/118.1, 244/137.1
See application file for complete search history.

(56) References Cited

U.S. PATENT DOCUMENTS

| | | | | |
|---|---|---|---|---|
| 2,625,118 | A * | 1/1953 | Lechner | B64D 9/00 410/104 |
| 7,258,516 | B1 * | 8/2007 | Collins | B60P 7/0807 410/99 |
| 8,960,607 | B2 * | 2/2015 | Dorris, III | B64D 1/12 244/137.1 |
| 2018/0340356 | A1 * | 11/2018 | Brennan | B60R 9/06 |

* cited by examiner

*Primary Examiner* — Stephen T Gordon
(74) *Attorney, Agent, or Firm* — Hartman Titus PLC; John D. Titus

(57) ABSTRACT

A method and apparatus for securing a container, in particular a Commercial-Off-The-Shelf (COTS) container to an aircraft consists of four tiedown adapters. The tiedown adapters are attached one each to a corner of the COTS container, typically at about the vertical midpoint of the edge. The tiedown adapters each comprises a base and a swivel. The base abuts the COTS container and has an integral cable fairlead. A cable is threaded through the fairleads so it wraps horizontally around the COTS container. The ends of the cable are then attached to each other using a turnbuckle, which is adjusted to put a predetermined tension in the cable. A shackle is attached to the swivel of each of the tiedown adapters and attached to an Adjustable Strap Assembly (ASA) or similar tiedown, which is attached to one of the load rings in the aircraft.

6 Claims, 2 Drawing Sheets

MISSION EQUIPMENT RESTRAINT SYSTEM

BACKGROUND OF THE INVENTION

This invention relates generally to cargo-carrying aircraft and in particular to methods and apparatus for securing cargo.

Aircrews of military cargo-carrying aircraft (CH-53D, -E, -K, V-22, C-130, etc.) need a container in which different kinds of mission equipment can be easily and quickly stowed and restrained in multiple positions in the cabin areas of their aircraft. Mission Equipment is not cargo but is equipment that is carried on board an aircraft to support a specific mission, including emergency medical equipment. The mission equipment restraint system has unique requirements in that it must restrain the equipment and its container when exposed to crash loads of 20 G in the forward, lateral, downward and 10 G in the upward directions. The aircrew must, however, be able to access the mission equipment during flight while it is being restrained to the required levels.

The currently-used system consists of a Commercial-Off-The-Shelf (COTS) container, in which the mission equipment is stowed. The loaded container is restrained by straps wrapped around and over it and attached to load rings anchored in the floor and/or side walls of the aircraft. The straps of the existing restraint system contain adjusters that are used to tighten the straps.

There are several problems associated with the currently used system with the first being its complexity. Crews must be trained to properly determine the number of straps required to provide the required force to support the load produced by the weight of the container and equipment in the container multiplied by the G factors (20, 20, 20 and 10) in the various directions. Since the straps are oriented at angles to the X, Y and Z directions of required load application, the components of loading to be provided by each strap must be calculated using geometric relationships and then the sum of the components of loading in the X, Y, and Z directions established and used to define the number of straps needed to provide the required restraint in the three directions (the restraint force in the down direction is provided by the floor of the aircraft). The strap angles are dictated by the locations of strap contact with the container and the location of the load ring to which it is attached. When the components of loading in the X, Y and Z directions provided by the various straps are added together, the sums must provide the required load retention in the three directions. The complexity described above results in a relatively long time required to install and apply the restraint system. As indicated above the process is time-consuming even when accomplished by trained personnel. Another ancillary problem is created by the clutter surrounding the container that can be caused by the unused lengths of straps lying coiled on the floor.

However, the major concern is that the current approach does not allow access to the equipment in the container during flight since, to meet the restraint requirements in all directions, some straps must be routed over the top of the container as well as around it. Since regulations require that the container be restrained at all times during flight, opening the container during flight violates the rules. When the equipment must be accessed during the mission, and especially when medical equipment is needed to save lives, the tiedown rules must be, and typically are, broken.

What is needed to solve these problems is a container and tiedown system that is easy and quick to install, which can be installed anywhere in the aircraft where there are tiedown rings, and which provides the required tiedown strength at all times including while being accessed during flight.

SUMMARY OF THE INVENTION

The present invention comprises a method and apparatus for securing a container to an aircraft. According to one embodiment of the invention, the container comprises a Commercial-Off-The-Shelf (COTS) container and the apparatus comprises four tiedown adapters. The tiedown adapters are attached one each to a corner of the COTS container, typically at about the vertical midpoint of the edge. The tiedown adapters each comprises a base and a swivel. The base abuts the COTS container and has an integral cable fairlead. A cable is threaded through the fairleads so it wraps horizontally around the COTS container. The ends of the cable are then attached to each other using a turnbuckle, which is adjusted to put a predetermined tension in the cable. A shackle is attached to the swivel of each of the tiedown adapters and attached to an Adjustable Strap Assembly (ASA) or similar tiedown, which is attached to one of the load rings in the aircraft. The tensioned cable passing through the fairleads reinforces the COTS container sufficiently to allow the ratchet straps to be tightened a predetermined tension that will hold the COTS container in place. The cable also reinforces the COTS container itself to withstand the G-force requirements. Optionally, corner load spreaders may be employed to reinforce the COTS container at critical points.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
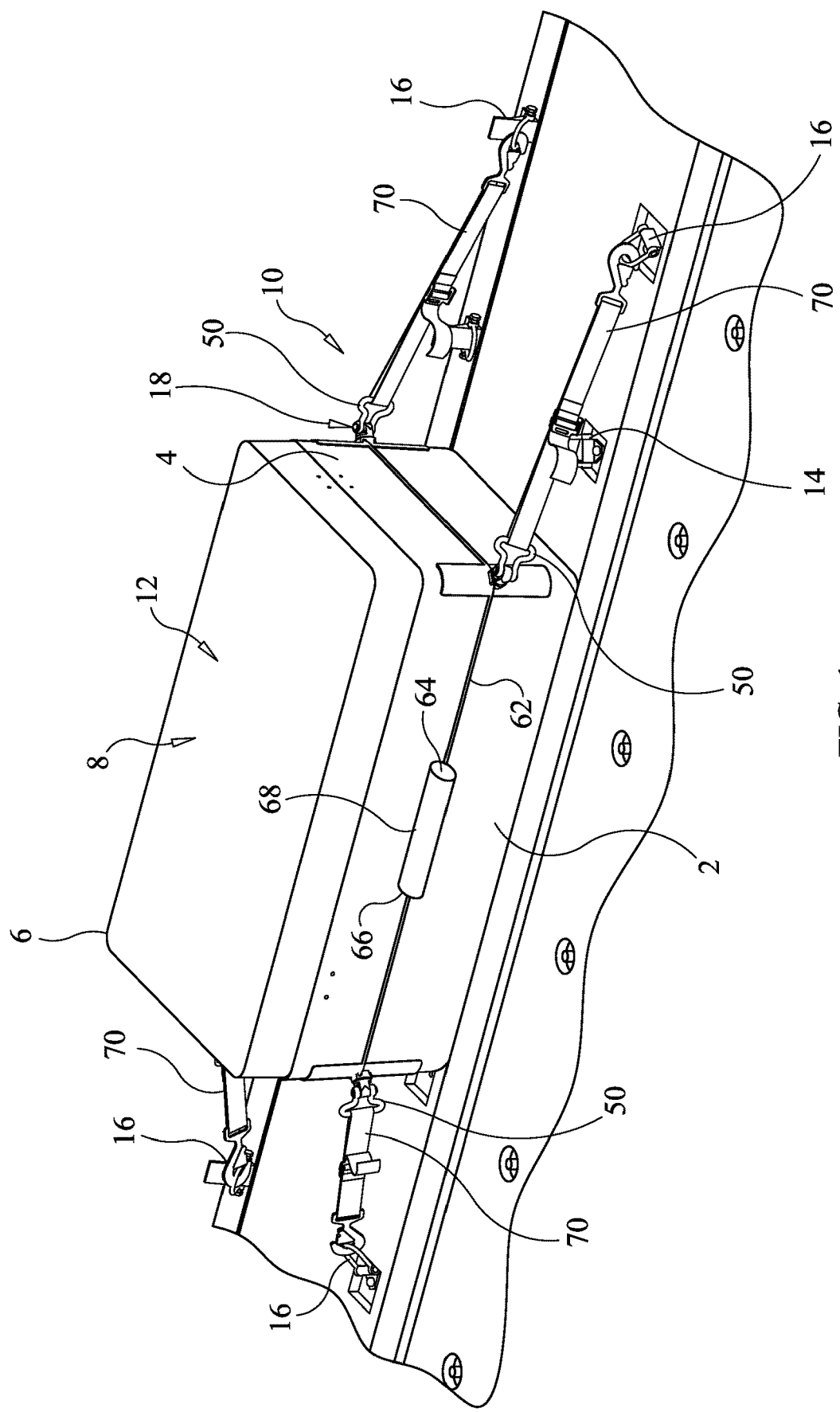
FIG. 1 is a perspective view of a Mission Equipment Restraint System incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

Figure 2:
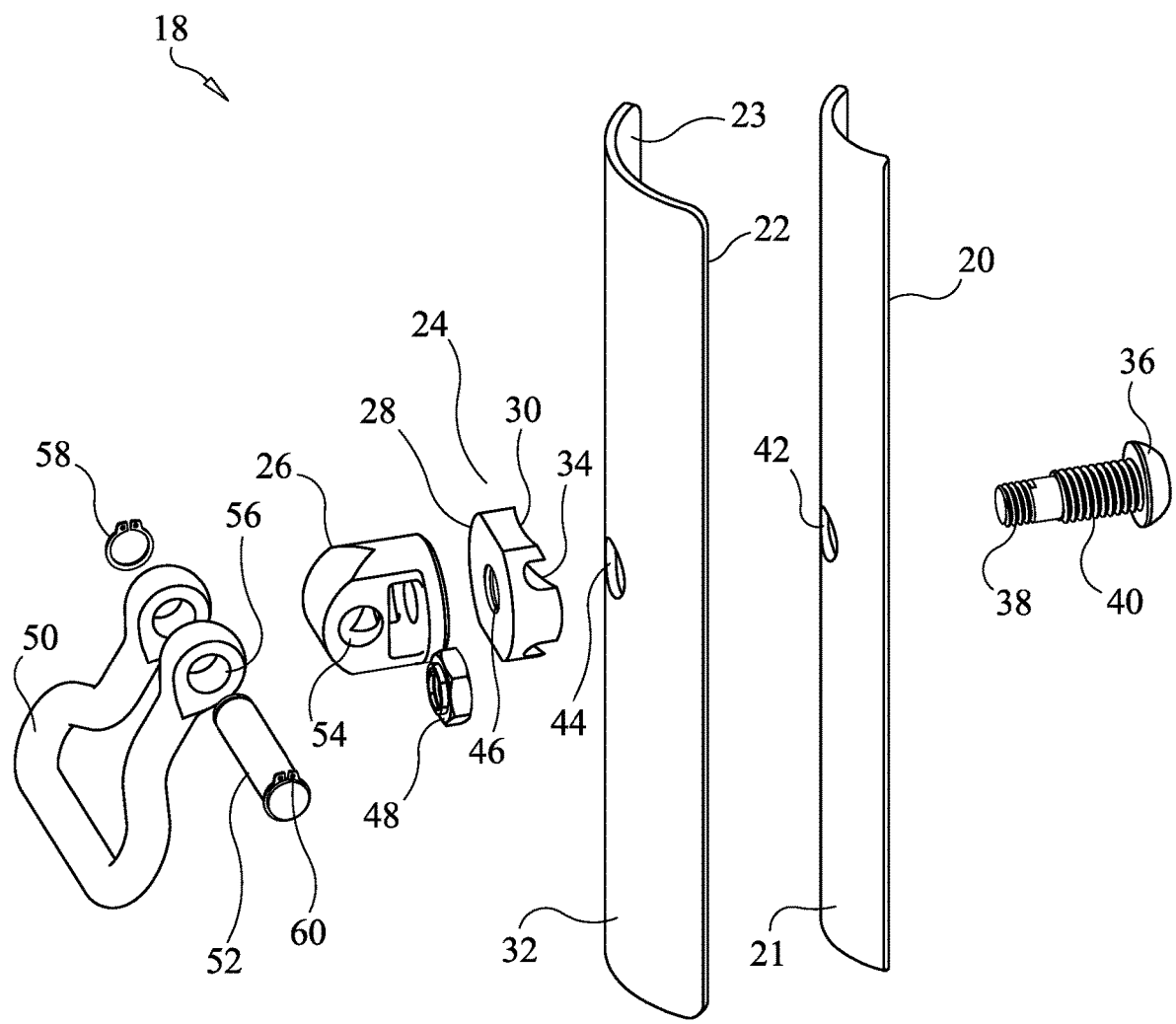
FIG. 2 is an exploded perspective view of the tiedown adapters of FIG. 1.

With reference to the figures and in particular FIG. 1, a mission equipment restraint system 10 incorporating features of the present invention is shown restraining a COTS container 12 to the airframe 14 of an aircraft equipped with a plurality of load rings 16. Container 12 typically comprises a generally rectangular container having an interior volume defined by a floor 2, four vertical walls 4, which are joined together at corners 6 and a removable lid 8. With additional reference to FIG. 2, the illustrative mission equipment restraint system 10 comprises four tiedown adapters 18 each attached to a corner of container 12. Each tiedown adapter 18 consists of an inner load spreader 20, and outer load spreader 22 a base unit 24 and a swivel 26. Inner load spreader 20 comprises an elongate bracket approximately 11 inches in length having a generally arcuate cross-section with a front surface 21 that matches the inner contour of container 12. Similarly, outer load spreader 22 comprises an elongate bracket approximately eleven inches in length having a generally arcuate cross-section with a back surface 23 that matches the outer contour of container 12. In the illustrative embodiment, inner load spreader 20 and outer load spreader 22 are formed of corrosion resistant steel, however, any suitably rigid material may be used without departing from the scope of the invention. A gasket (not shown), may be placed between inner load spreader 20 and container 12 and/or between outer load spreader 22 and container 12 to provide a watertight seal. Preferably the gasket(s) are similar in shape to load spreaders 20 and 22 so as not to compromise their load-spreading function.

Base unit 24 comprises a solid structural member having a flat upper surface 28 and a curved lower surface 30 adapted to match the outer surface 32 of outer load spreader 22. The lower surface 30 of base unit 24 further comprises at least one groove which cooperates with outer surface 32 to form a cable fairlead 34, the purpose of which will be described more fully hereinafter. Tiedown adapter 18 is assembled to container 12 using a stepped-fastener 36 having a relatively smaller diameter thread 38 at the tip and a relatively larger diameter thread 40 near the head. Step fastener 36 passes through a hole 42 formed in inner load spreader 20, through the container wall, through a corresponding hole 44 formed in outer load spreader 22 and is threaded into base unit 24. Base unit 24 has female threads 46 that are matched to the larger diameter threads 40 of stepped fastener 36. Swivel 26 is then attached to stepped fastener 36 using nut 48, which in the illustrative embodiment comprises an elastic stop nut which is tightened a sufficient amount to secure swivel 26 while allowing it to rotate freely. A load ring such as shackle 50 is attached to swivel 26 by passing a clevis pin 52 through corresponding apertures 54, 56 formed in swivel 26 and shackle 50, respectively. External snap rings 58, 60 hold clevis pin 52 in place. Although in the illustrative embodiment fairlead 34 is formed by two cooperating surfaces between base unit 24 and outer load spreader 22, fairlead 34 could be formed as a through hole in base unit 24 without departing from the scope of the invention. Similarly, although tiedown adapter 18 is assembled using a threaded fastener alternative means of assembling tiedown adapter, for example using rivets or other conventional fasteners are considered within the scope of the invention.

With reference again to FIG. 1, a tension member 62, which in the illustrative embodiment comprises a wire rope/cable, is wrapped horizontally around container 12, passing through fairleads 34 formed in base units 24. The free ends 64, 66 of tension member 62 are joined together with a tensioning device 68 which in the illustrative embodiment comprises a turnbuckle. The tensioning device 68 is then tightened to a tension of approximately 500 pounds. The tension member thus forms an exterior reinforcement around the perimeter of walls 4 of container 12, preferably at approximately the vertical midpoint of walls 14. Not only does tension member 62 provide a load path for the forces exerted by the tiedown straps (as described hereinafter), but it also provides a reinforcement for the contents of container 12 under the specified acceleration loading.

Tiedown straps 70, for example standard Adjustable Strap Assemblies (ASA's) are attached between shackles 50 and load rings 16 and tensioned to a specified tension which in the illustrative embodiment is approximately 100 pounds each. Because the geometry is fixed, the tension in each ASA is directly proportional to the weight of the contents of container 12 and therefore need not be calculated on a case-by-case basis. Inner load spreader 20 may optionally extend to the floor 20 of container 12 in cases where wall 4 of container 12 is incapable of reacting the vertical load of tiedown straps 70. As used herein, "tiedown strap" is not limited to a strap, but can be rope, chain, cable, hooks or any other suitable member for attaching between the load ring 16 and tiedown adapter 18.

Although certain illustrative embodiments and methods have been disclosed herein, it will be apparent from the foregoing disclosure to those skilled in the art that variations and modifications of such embodiments and methods may be made without departing from the invention. For example, although in the illustrative embodiment, the tiedown straps do not cross, in certain applications, the tiedown straps will cross, without departing from the scope of the invention. Also, although in the illustrative embodiment the tensioning device is tensioned to 500 pounds and the tiedown straps tensioned to 100 pounds each, for lighter and/or smaller containers the tension in tensioning device could be 100 pounds or less and for larger and/or heavier containers, the tension in tensioning device could be 1000 pounds or more, with the tiedown straps tensioned proportionally more or less. Similarly, although a COTS container is shown in the illustrative embodiment, a specially fabricated container, including a container with fairleads molded or otherwise formed in the container itself is contemplated within the scope of the invention. Accordingly, it is intended that the invention should be limited only to the extent required by the appended claims and the rules and principles of applicable law. Additionally, as used herein, references to direction such as "up" or "down" as well as recited materials or methods of attachment are intended to be exemplary and are not considered as limiting the invention and, unless otherwise specifically defined, the terms "generally," "substantially," or "approximately" when used with mathematical concepts or measurements mean within ±20 degrees of angle or within 20 percent of the measurement, whichever is greater. As used herein, a step of "providing" a structural element recited in a method claim means and includes obtaining, fabricating, purchasing, acquiring or otherwise gaining access to the structural element for performing the steps of the method. As used herein, the claim terms are to be given their broadest reasonable meaning unless a clear disavowal of that meaning appears in the record in substantially the following form ("As used herein the term _____ is defined to mean a _____").

What is claimed is:

1. A container adapted to be secured to an aircraft, the aircraft having an airframe with a plurality of load rings attached thereto, the container comprising:

a floor and a plurality of walls joined together at a plurality of corners;

a plurality of tiedown adapters, each of said plurality of tiedown adapters extending outward from an outside surface of one of said plurality of corners, each of said tiedown adapters comprising a base unit and a load ring, the base unit having a cable fairlead formed therein; and a tension member having a first end and a second end, the tension member passing substantially horizontally through the fairleads in the base of each of said plurality of tiedown adapters, the first end being attached to the second end and tensioned to a predetermined tension to provide a compressive load on the walls of the container.

2. The container of claim 1, further comprising:

a plurality of inner load spreaders, each of said inner load spreaders comprising an elongate plate with an aperture formed therein, the inner load spreaders each having a front surface matching an inner surface of a corner of the container.

3. The container of claim 2 further comprising:

a plurality of outer load spreaders, each of said outer load spreaders comprising an elongate plate with an aperture formed therein, the outer load spreaders each having a rear surface matching an outer surface of a corner of the container.

4. The container of claim 1, wherein:

the container comprises a Commercial Off The Shelf container.

5. The container of claim 1, wherein:

the tiedown adapter further comprises a swivel operatively attached to the base unit, wherein a load ring is attached to the tiedown adapter through the swivel.

6. The container of claim 1, wherein:

the fairleads comprise a channel formed in a lower surface of the base unit.

* * * * *